(12) United States Patent
Coops et al.

(10) Patent No.: US 7,099,254 B2
(45) Date of Patent: Aug. 29, 2006

(54) OPTICAL SCANNING DEVICE

(75) Inventors: Peter Coops, Eindhoven (NL); Joris Jan Vrehen, Eindhoven (NL); Robertus Johannes Heeman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 590 days.

(21) Appl. No.: 10/227,219

(22) Filed: Aug. 23, 2002

(65) Prior Publication Data

US 2003/0072248 A1    Apr. 17, 2003

(30) Foreign Application Priority Data

Aug. 27, 2001    (EP)    ................................... 01203204

(51) Int. Cl.
*G11B 7/135*    (2006.01)
(52) U.S. Cl. ................ 369/53.26; 369/112.16; 369/112.28
(58) Field of Classification Search ............ 369/53.26, 369/112.16, 112.28, 120, 112
See application file for complete search history.

(56) References Cited

U.S. PATENT DOCUMENTS 5,804,814 A * 9/1998 Musha et al. ............ 250/201.5
5,933,401 A * 8/1999 Lee et al. ............... 369/112.21
2001/0048070 A1* 12/2001 He et al. ..................... 250/225
2003/0165106 A1* 9/2003 Dambach et al. ....... 369/112.07

FOREIGN PATENT DOCUMENTS

EP    1001414 A2    5/2000

\* cited by examiner

*Primary Examiner*—Wayne Young
*Assistant Examiner*—Van T. Pham
(74) *Attorney, Agent, or Firm*—Michael E. Belk

(57) ABSTRACT

An optical scanning device for scanning an optical record carrier includes a radiation source and a beam splitter arranged to pass a first portion of the source beam to the record carrier, and a second portion to an intensity sensor. A signal detector is arranged in the path of the beam reflected by the record carrier. False radiation reflected by the signal detector can be prevented from reaching the intensity sensor by tilting the signal detector. A polarization filter may be arranged in front of the intensity sensor to prevent false radiation reflected by the radiation source and by the signal detector from reaching the intensity sensor.

19 Claims, 6 Drawing Sheets

OPTICAL SCANNING DEVICE

The invention relates to an optical scanning device for scanning an optical record carrier, said device comprising a radiation source for emitting an incident radiation beam, a beam splitter located in the path of the incident radiation beam from the radiation source to the location of said optical record carrier and arranged to pass a first portion of the incident beam intensity, which is incident upon the beam splitter towards the optical record carrier and to pass a second portion of said incident beam intensity towards an intensity sensor for sensing radiation of the incident beam, and a radiation-sensitive signal detector for converting a radiation beam reflected from said optical record carrier and passing along a path including the beam splitter into electric detector signals.

In particular, but not exclusively, the invention relates to a device in which a higher beam power is required during an optical record carrier write process than during an optical record carrier read process and to a combi-player device and a dual writer device.

Due to the presence of the beam splitter and other reflecting means, the optical axis is not a straight line throughout the device but a folded axis, which may have different directions (at different positions). The local direction of the optical axis is understood to mean the direction of this axis at the location of an element referred to.

An optical scanning device provided with an intensity sensor, also called a monitoring detector or a forward sensing (FWS) detector is disclosed, for example, in EP-A 1 001 414. The device described in the latter document is capable of writing or reading on or from CD (compact disc) formats, as well as reading from DVD (digital versatile disc) formats. The device comprises two radiation sources emitting radiation beams having different wavelengths. A single main optical path is used for both of the different wavelength beams and respective beam splitters are used to couple the radiation beams into the main optical path. An intensity sensor in the form of a photodiode and capable of detecting the radiation output of the first and second sources is arranged behind one of the beam splitters, outside the main optical path. In general, the output of the intensity is supplied to a source control unit to keep the intensity of the beam emitted by the source at a desired level.

In the case of an optical record carrier format such as CD-R (compact disc-recordable), the discs exhibit a relatively high reflectance. To write data to a disc of these, and other, formats, the write optical power level should be increased. Also the relentless pursuit of ever-higher writing speeds necessitates an ever-increasing write power level.

It has been discovered that, for high power levels, the servoloop, comprising the intensity detector and the power control circuit does not function satisfactorily, and that this problem increases as the paths for the incident beam and the reflected beam have a higher radiation efficiency. Radiation efficiency is understood to mean the degree to which a radiation path is capable of transmitting supplied radiation to the target position, i.e. for the incident beam to the optical disc and for the reflected beam to the signal detector.

It is an object of the present invention to provide an optical scanning device as defined in the preamble in which said problem is mitigated. This device is characterized by means for preventing reflected radiation reflected from the signal detector and/or the radiation source from reaching the point of intersection of the optical axis and the plane of the intensity sensor.

The invention is based on the insight that part of the radiation of the reflected beam reaches the radiation source and/or the signal detector as unwanted or false radiation, and that these elements reflect part of this false radiation in the direction of the intensity sensor. The output signal of this sensor is then no longer proportional to the intensity of the incident beam only and the intensity of the source is controlled at a false level. This effect increases with an increasing intensity of the incident beam and an increasing radiation efficiency of the radiation path. By providing means, which prevent stray radiation from reaching the position of an on-axis intensity sensor, the output signal of this detector will not be influenced by such stray radiation. These means may take different forms.

A first embodiment of the optical scanning device is characterized in that said means are provided for tilting the signal detector with respect to the local optical axis.

Radiation that is reflected by the signal detector, i.e. false radiation, now follows a path outside the path towards the intensity sensor.

A second embodiment of the optical scanning device is characterized in that said means comprises a wedge-shaped element arranged in the path through the beam splitter up to the signal detector.

The use of a wedge-shaped element has a similar effect as tilting the signal detector.

This embodiment, when comprising a focus servolens arranged between the beam splitter and the signal detector, is preferably further characterized in that the wedge-shaped element and the focus servolens are integrated to one element.

Alternatively, this embodiment may be characterized in that the wedge-shaped element is integrated with the beam splitter. In this case fewer optical components are needed.

A third embodiment of the optical scanning device is characterized in that said means comprises a polarization filter arranged between the beam splitter and the intensity sensor, and in that a quarter-wavelength plate is arranged between the beam splitter and the location of the optical record carrier.

In this embodiment, advantageous use is made of the fact that the quarter-wavelength plate, which is already present for other purposes, distinguishes the wanted and unwanted radiation incident on the intensity sensor by their polarization states so that the polarization filter can stop the unwanted radiation.

In a scanning device, two or more of the above-mentioned different means for preventing false radiation from being incident on the intensity sensor may be combined, which allows the required false radiation suppressing function to be divided into sub-functions each performed by a different one of the means.

A further combination is realized in an optical scanning device, which is characterized by the additional measure of arranging the intensity sensor off-axis with respect to the local optical axis.

Arranging the intensity sensor off-axis is known per se, but has some disadvantages if it should provide the entire false radiation reduction. By combining one or more of the means according to the invention with the off-axis positioning, the latter becomes more attractive.

The advantages of the invention are especially manifest in an optical scanning device, which is characterized in that the beam splitter is a polarizing beam splitter.

By means of a polarizing beam splitter, in combination with a quarter-wavelength plate, it can be arranged that substantially 100% of the incident beam radiation is passed towards the optical record carrier and substantially 100% of the reflected radiation beam is passed towards the signal detector. In practice it is possible that said 100% is not fully achieved due to, for example, tolerances on the coating layers of the polarizing beam splitter. A consequence of the highly radiation-efficient radiation paths obtained by means of a polarizing beam splitter is that the amount of false radiation incident on the intensity sensor may become high so that the invention is very useful for a device using polarization optics.

A specific embodiment of a scanning device which employs polarization optics and is especially adapted to the use of an intensity detector and for which the invention is very useful, is characterized in that the beam splitter is a partially polarizing beam splitter arranged to pass a first proportion of the incident beam intensity incident upon the beam splitter and having a first polarization towards the optical record carrier and to pass a second proportion of the reflected beam intensity incident upon the beam splitter and having a second polarization orthogonal to the first polarization towards the signal detector, said first proportion of intensity being greater, as a proportion, than said second proportion of intensity.

By using of such a partially polarizing beam splitter, a relatively high optical power at the optical record carrier can be achieved for writing purposes whilst allowing the beam splitter to be manufactured in a relatively efficient manner. For the sake of clarity, the term "proportion" is to be understood as a fraction. Namely the "proportion of intensity passed" is the intensity of the beam passed by the beam splitter divided by the intensity of the beam incident on the beam splitter, each intensity taken at the centre of the beam. A relatively high level of transmission of the reflected beam towards the signal detector is also achievable, such that a desired readout performance is achieved. The partially polarizing beam splitter can also be given a specific angular tolerance. Furthermore, a reduced sensitivity to birefringence of the optical record carrier, which in some arrangements may reduce signal levels, can be provided.

The scanning device with a partially polarizing beam splitter may be further characterized in that said beam splitter is arranged to reflect the incident beam and to transmit the reflected beam, the reflectivity of the beam splitter for the polarization of the incident beam being greater than the transmittivity of the beam splitter for the polarization of the reflected beam.

Alternatively, such a device may be characterized in that said beam splitter is arranged to transmit the incident beam and to reflect the reflected beam, the transmittivity of the beam splitter for the polarization of the incident beam being greater than the reflectivity of the beam splitter for the polarization of the reflected beam.

The scanning device with a partially polarizing beam splitter may be further characterized in that said first proportion is greater than 75% and less than 97%.

Preferably, the first proportion is between 85% and 95%.

On the other hand, the scanning device may be characterized in that said second proportion is within the range of 15% to 75%.

Preferably, the second proportion is within the range 25% to 62%.

A specific embodiment of the scanning device with a partially polarizing beam splitter suitable for use with record carriers of different formats is characterized in that it comprises a second radiation source for emitting a second radiation beam having a different predetermined wavelength, and a second beam splitter for reflecting or transmitting said second radiation beam towards the optical record carrier.

This embodiment may be used in a so-called combi-player, i.e. an apparatus for both writing a CD-type disc and reading a DVD-type disc.

This embodiment may be further characterized in that the first beam splitter is arranged to have a substantially non-polarizing effect on radiation of said second wavelength.

In addition thereto, this embodiment may be further characterized in that said second beam splitter is arranged to have a substantially non-polarizing effect on radiation of said first and/or said second wavelength.

The second beam splitter may show approximately 50% transmission for radiation of the second wavelength and substantially 100% transmission or reflection for radiation of the first wavelength.

These and other aspects of the invention are apparent from and will be elucidated by way of non-limitative example with reference to the embodiments described hereinafter and illustrated in the accompanying drawings. In the drawings.

The embodiments according to the invention of the optical scanning device are used for writing and reading data in a recordable optical disc, such as a CD-R (compact disc-recordable), a CD-RW (compact disc -rewritable) or a DVD-R (digital versatile disc-recordable). The disc includes an outer transparent layer covering at least one information layer. In the case of a multilayer optical disc, two or more information layers are arranged behind the cover layer, at different depths within the disc. The side of the information layer, or, in the case of a multilayer disc, the side of the layer furthest away from the cover layer facing away from the cover layer is protected from environmental influences by a protection layer. The side of the cover layer facing the scanning device is the disc entrance face.

Information like an audio program, a video program or data may be stored in the information layer, or layers, of the optical disc in the form of optically detectable marks arranged in substantially parallel, concentric or spiral tracks. The marks may be in any optically readable form, for example in the form of pits or areas with a reflection coefficient different from that of their surroundings. The information layer, or layers, are formed of an optical recordable material, for example a radiation-sensitive dye as used in the CD-R format, which, for writing the disc, requires a radiation power that is relatively high compared to the power required for data read-out.

Figure 1:
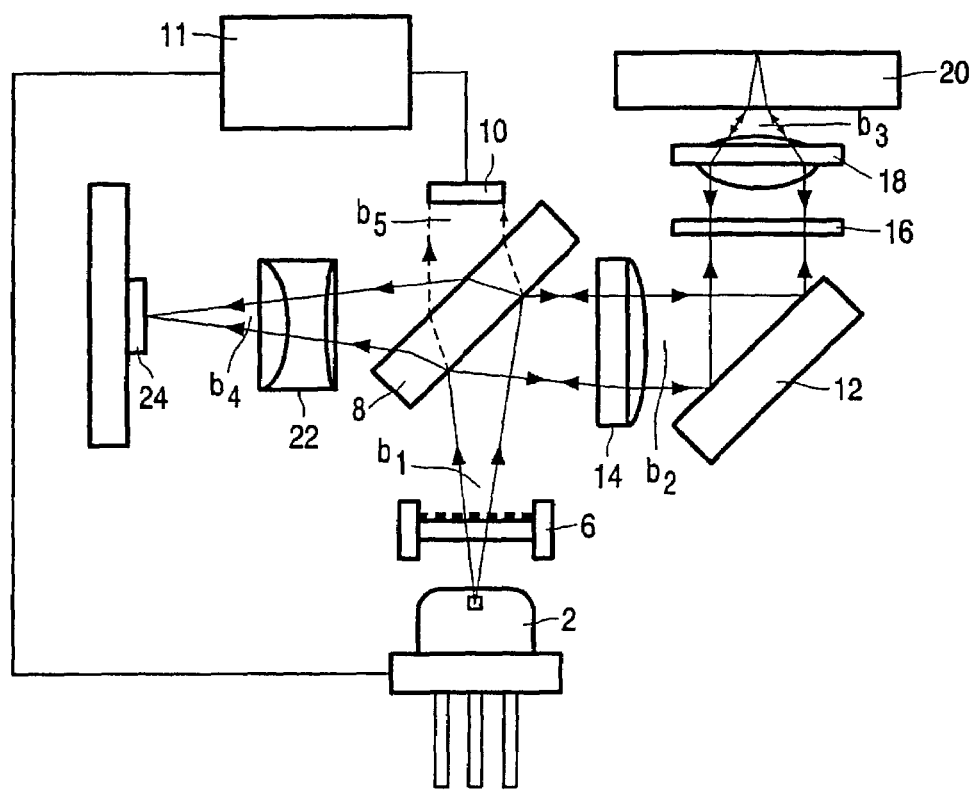
FIG. 1 shows a first embodiment of an optical scanning device wherein the invention may be implemented.

The optical scanning device includes a radiation source 2, for example a semiconductor laser, operating at a predetermined wavelength, for example the CD wavelength $\lambda=790$ nm. The laser may emit linearly polarized light. The source 2 emits a diverging radiation beam $b_1$. This beam may pass a diffraction grating 6, which splits the beam in a central, main beam and two side beams (not shown). The side beams are used, in a well-known manner, for tracking purposes. The beam $b_1$ is incident on a beam splitter, or reflector, 8, which is situated in the optical path between the optical disc 20 and a signal detector 24. The beam splitter may be a beam-splitting plate, as shown in FIG. 1, or a cubic beam splitter. As the beam $b_1$ incident on the beam splitter is a divergent beam, the beam splitter preferably has a good tolerance for angular variation from the axial. The beam splitter reflects the largest part, for example 80 to 90%, of the incident beam $b_1$ and transmits the remainder as beam $b_5$ to an intensity sensor, also called: forward sensing (FWS) detector 10, for example a photodiode. This sensor is arranged to detect radiation from the central, relatively high intensity region of the beam $b_5$. The sensor 10 is used to monitor and control the power of the radiation source 2, both during data read-out from the disc 20 and during the process of writing data to the disc 20, when the radiation source is set at a relatively high power level. To control the power of the radiation source 2, the output of the monitor diode is supplied to an input port of a control circuit 11, an output port of which is connected to the radiation source 2, which control circuit controls the electric current supplied to the laser 2.

The reflectivity of the beam splitter 8 for the incident beam $b_1$ is generally selected between 75% and nearly 100% for the following reasons. By ensuring that the reflectivity is above 75%, the writing power of the incident radiation beam $b_1$ reflected towards the disc is maintained at a high level. However, for a reflectivity above 97%, a forward-sensing signal becomes so low that, including coating manufacturing tolerances, the spread in signal levels becomes too large. More preferably, the reflectivity is selected in the range between 85% and 95%, thus allowing a relatively low-cost diode, used as the forward-sensing detector 10, to provide accurate and high bandwidth power correction signals during a writing procedure.

The portion of the beam $b_1$ that is reflected by the beam splitter 8 is incident on a collimator lens, which converts the divergent beam $b_1$ into a parallel beam $b_2$. This beam is reflected by a folding mirror 12 towards the disc 20 and passes an objective lens 18. This lens converts the parallel beam $b_2$ into a convergent beam $b_3$ and focuses this beam onto a spot on an information layer in the disc 20. The information layer reflects the beam and modulates the beam in accordance with the information encoded in the track momentarily scanned, when the scanning device is in the read mode. The reflected beam follows the same path back through the objective lens 18 and the collimator lens 14 and is partly transmitted as beam $b_4$ towards a radiation sensitive detector 24. This detector, also called signal detector, converts the modulated beam $b_4$ into an electric signal for data read-out and signals for focus control and tracking control, as is known in the art. A further lens 22 may be arranged (between the beam splitter 8 and the signal detector 24). This lens may be a cylinder lens, which renders the beam $b_4$ astigmatic for focus error detection purposes, as is known in the art. This lens is also called servo-focusing lens. The collimator lens 14 may also be arranged between the folding mirror 12 and the objective lens 18.

In an alternative embodiment, the beam splitter transmits the largest part of the radiation of beam $b_1$ towards the disc and reflects the remainder towards the intensity sensor.

Figure 2:
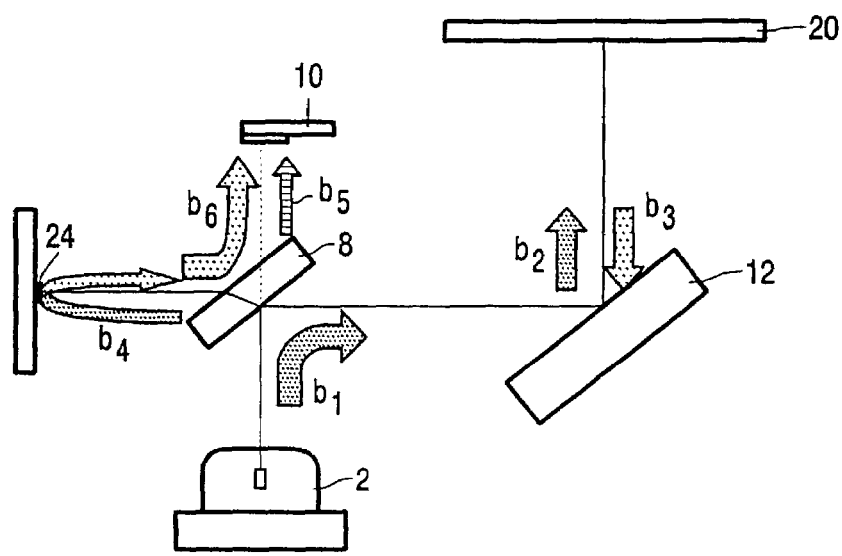
FIG. 2 illustrates how radiation reflected by the signal detector can reach the intensity sensor.

As illustrated in FIG. 2, part of the radiation of beam $b_4$ incident on the signal detector 24 is reflected, as beam $b_6$, by the front side of this detector. Part of the beam $b_6$ is reflected, or transmitted in the case of the alternative to the embodiment of FIG. 1, towards the intensity sensor 10. In FIG. 2 only beam-reflecting elements are shown and the different types of arrows denote the different beams. Due to the incidence of beam $b_6$ on the monitor diode, the intensity of the radiation incident on this diode is no longer proportional to only the intensity of the beam $b_1$ emitted by the source and to that of the beam $b_3$ incident on the disc. If the front face of the signal detector is an air-silicon interface, this front side may reflect up to 30% of the radiation of beam $b_4$. If the detector 24 is provided with a plastic cover, the reflection at the plastic-silicon interface is somewhat lower. In any case, the incidence of this kind of false radiation, thus of beam $b_6$, on the intensity sensor cannot be neglected and influences the laser power control system.

Figure 3:
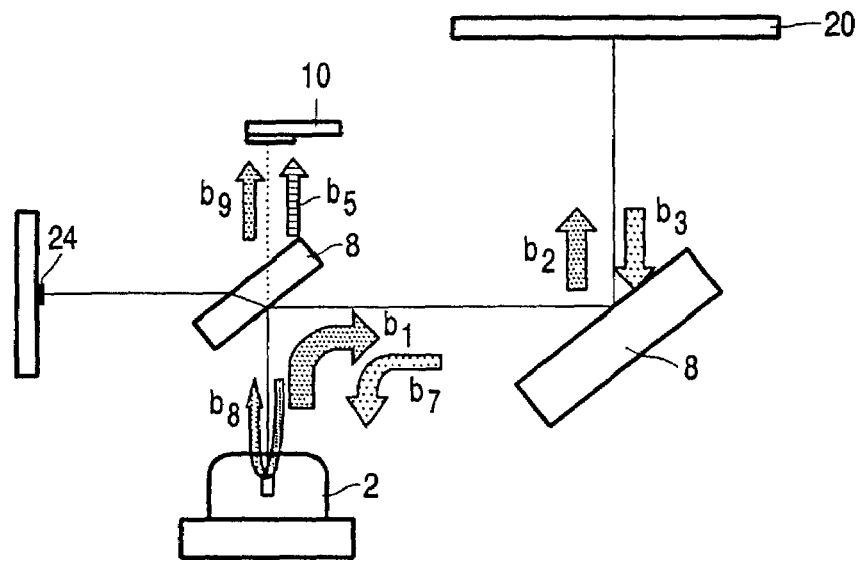
FIG. 3 illustrates how radiation reflected by the radiation source can reach the intensity sensor.

As illustrated in FIG. 3, also part of the beam reflected by the disc is reflected, as beam $b_7$, by the beam splitter 8 towards the radiation source 2. The front facet of this source reflects part of the beam $b_7$, as beam $b_8$ towards the beam splitter 8. This splitter transmits part of the beam $b_8$, as beam $b_9$, in the direction of the intensity sensor 10. The incidence of this kind of false radiation, thus of the beam $b_9$, on the monitor diode has a similar effect on the laser power control system as the incidence of beam $b_6$ in FIG. 2.

The intensity of beams $b_6$ and $b_9$, and thus the amount to which the laser power control system is disturbed depends on the reflection coefficient of the disc 20. In the case of a low reflective disc, said intensities may be low, but if the disc shows a high reflectivity, the effects caused by said intensities will readily become unacceptable. The effects are certainly not acceptable if information has to be written at a high speed (high data rate) and a powerful incident beam $b_3$ has to be used. If the information layer of the disc comprises a dye material, writing of information marks will cause changes in the absorption of the incident writing beam. Then the intensities of beams $b_6$ and $b_9$ will vary during writing of a mark. If a fast control circuit 11 is used, the fast intensity variations will change the writing laser pulses sent to the disc. In a scanning device as shown in FIG. 1 with a neutral, i.e. polarization-independent, beam splitter, which reflects 80% of the incident beam and reflects 20%, the sum of the intensity of beam $b_6$ and beam $b_7$ may amount to 20% of the intensity of beam $b_5$. In a scanning device wherein polarization optics is used to improve the radiation efficiency both in the path towards the disc (for high speed writing) and in the path towards the signal detector (for high speed read-out of low reflective discs), the sum of the intensities of beams $b_6$ and $b_9$ may even become equal to the intensity of beam $b_5$.

The most common radiation source for the optical scanning apparatus discussed here is a semiconductor laser. Such a laser emits coherent radiation having a sufficient coherence length to allow radiation of the beams $b_6$ and $b_9$ to interfere with the radiation of beam $b_5$ at the monitor diode 10. This will create another problem, namely noise in beam $b_1$. In total, incidence of stray light beams $b_6$ and $b_9$ on the monitor diode causes a bad writing performance of the device because the control of the laser power is not sufficiently accurate and reliable.

One could try to avoid this problem by positioning the intensity sensor, or forward-sensing diode, 10 off-axis, i.e. in the border area of the incident beam $b_1$, such that beams $b_6$ and $b_9$ skim this diode. However, the diode 10 should then be positioned at a relatively large distance from the optical axis. This distance is inversely proportional to the distance between the signal detector and the diode 10 and the distance between the laser 2 and the diode 10, which distances should be as small as possible in view of the compactness of the scanning device. Positioning the intensity sensor 10 at a large distance from the optical axis will cause an unwanted spread of the sensor signal between scanning devices. This spread is due to the positioning of the sensor in the outer portion of the far field of the diode laser and the spread in far field width between diode lasers. Moreover, during the manufacture of the semiconductor laser, it is inevitable that the laser chip shows a tilt of some degrees with respect to its encapsulation, which tilt will be different for different lasers. As in the scanning device the laser beam is aligned with the optical axis, the semiconductor laser surface, which reflects beam $b_7$ (FIG. 3), is tilted with respect to the optical axis. This means that the axis of beam $b_8$ extends at an angle of some degrees with the optical axis of the device and may still be incident on the off-axis monitor diode. This necessitates the monitor diode to be positioned even further off-axis.

Figure 4:
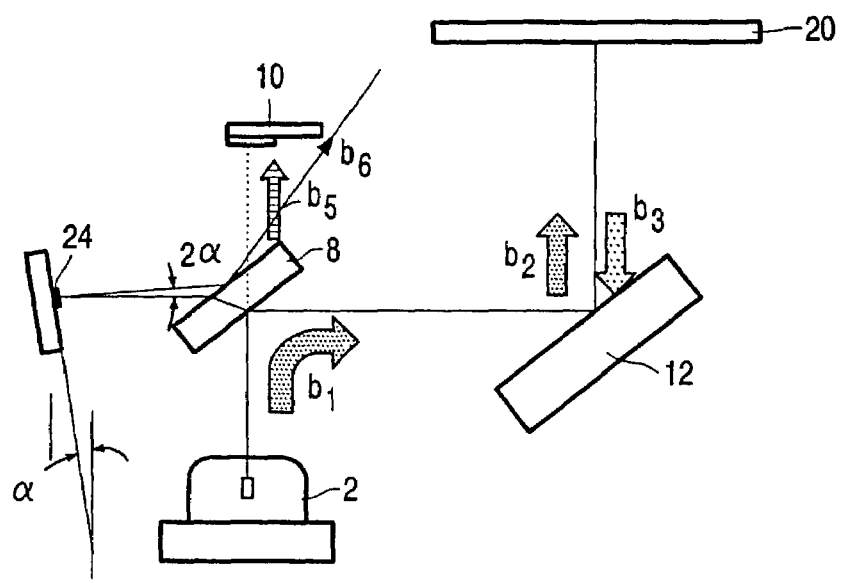
FIG. 4 shows a portion of a scanning device with a tilted signal detector.

According to the invention, incidence of the beam $b_6$ on the intensity sensor is prevented by tilting the signal detector 24 around an axis perpendicular to the device optical axis at the location of the detector 24, as shown in FIG. 4. The beam $b_4$ is now incident on the signal detector at an angle of incidence $\alpha$ (the tilt angle) with respect to the normal to the detector surface, and the beam $b_6$ reflected by this surface also extends at an angle $\alpha$ with this normal. The beam $b_6$ is thus reflected by the detector surface at an angle of $2\alpha$ with respect to the optical axis. The tilt angle is chosen to be such that the beam $b_6$ does not meet the intensity sensor 10. As the angle of reflection at the signal detector 24 is twice the tilt angle, the latter angle may remain small, for example of the order of 10°, so that the signal detection by the detector 24 will not be influenced. By tilting the signal detector, the angle of incidence of beam $b_6$ on the beam splitter, thus also the angle of reflection is increased, i.e. larger than 45° as is the case in FIG. 2. In this embodiment, the beam splitter thus also helps to change the direction of beam $b_6$ such that it passes the intensity sensor 10 at the right side.

The signal detector may also be tilted in the opposite direction. The reflected beam $b_6$ will then be bent downwards by the detector and to the left by the beam splitter, so that beam $b_6$ passes the intensity sensor 10 at the left side.

Figure 5:
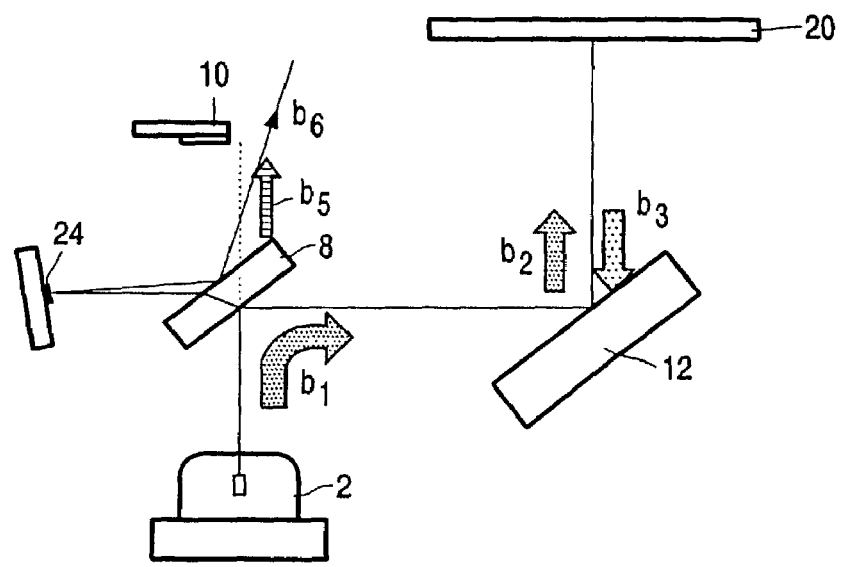
FIG. 5 shows a portion of a scanning device with a tilted signal detector and an off-axis intensity sensor.

The measure of the invention for preventing beam $b_6$ from being incident on the monitor diode may be combined with the known measure of positioning the monitor diode off-axis for the same purpose. This is illustrated in FIG. 5, which shows both a tilted signal detector 24 and an off-axis intensity sensor 10. As sensor 10 is displaced in a direction opposite the direction in which the beam $b_6$ is deflected by the tilted signal detector, both measures of tilting and off-axis positioning contribute to preventing beam b6 from reaching the intensity sensor. As a consequence, the tilt angle of the signal detector is smaller than in the embodiment of FIG. 4 and the distance of the intensity sensor from the device axis is smaller than in the case where only the measure of off-axis positioning of the intensity sensor is carried out. The latter means that the embodiment of FIG. 5 does not show the disadvantages discussed herein before with respect to off-axis positioning of the intensity sensor.

Figure 6:
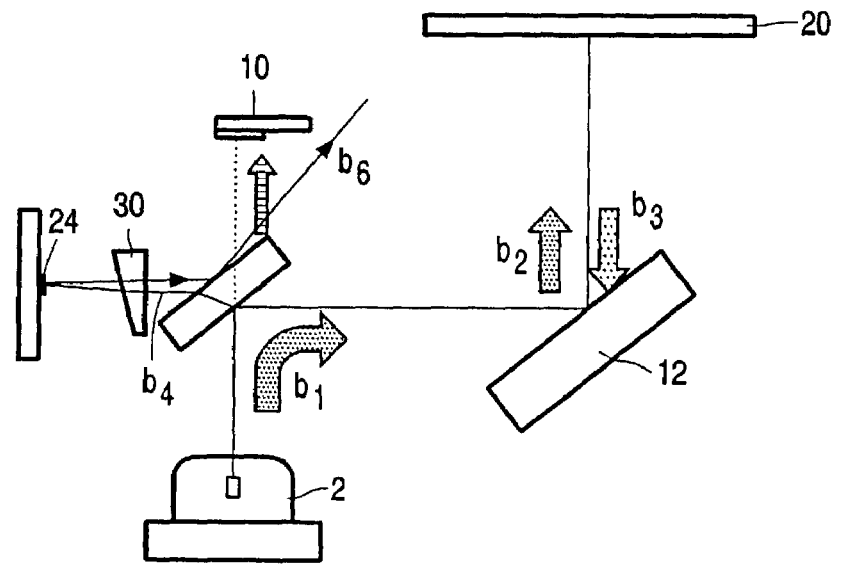
FIG. 6 shows a portion of a scanning device with a wedge-shaped element between the beam splitter and the signal detector.

FIG. 6 shows an embodiment of the optical scanning device wherein a wedge-shaped element 30 is arranged between the beam splitter 8 and the signal detector 24. The beam $b_4$ incident on this element is refracted away at its skew face from the optical axis so that this beam is incident on the signal detector 24 at an angle of a few degrees with respect to the normal to the surface of the detector. As a consequence, the beam $b_6$ reflected by this surface is directed away from the optical axis such that, after a second passage through the wedge-shaped element and reflection at the beam splitter, the beam $b_6$ skims the intensity sensor 10 at the right side. By using an element with a skew opposite to that shown in FIG. 6, or an element with a skew front face instead of a skew rear face, it can be arranged that the beam $b_6$ skims the intensity sensor at the left side.

Figure 7:
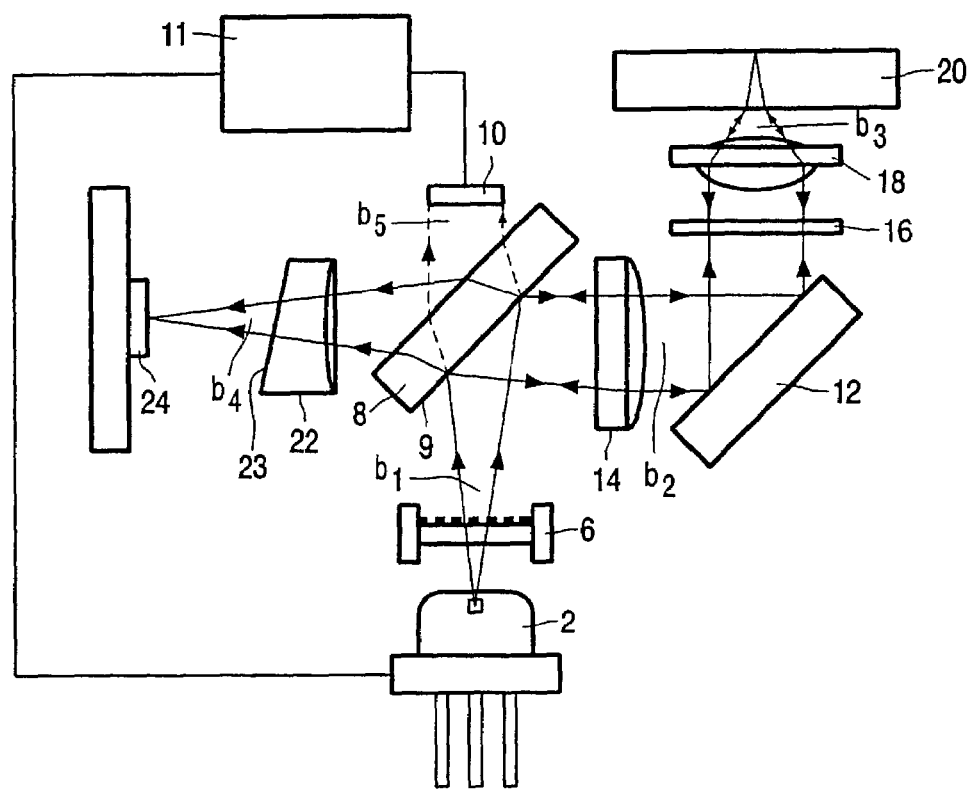
FIG. 7 shows such a scanning device wherein the wedge-shaped element is integrated with a focus servolens.
Figure 9:
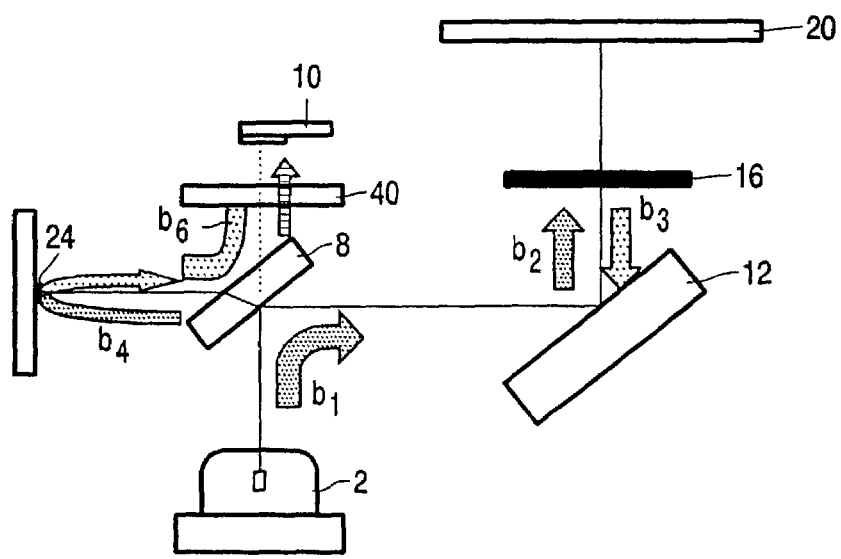
FIG. 9 shows a portion of a scanning device with a polarization filter arranged between the beam splitter and the intensity sensor.

In an optical scanning device, which comprises an optical element between the beam splitter and the signal detector, the wedge-shaped element can be integrated with this optical element by making one of the surfaces of the latter element a skew surface. For example, a surface of the focus servolens 22 in the optical scanning device of FIG. 1 is made skew. This is illustrated in FIG. 7, which differs from FIG. 1 only in that the rear surface 23 of the lens 22 is skew in the plane of the drawing. In the direction perpendicular to this plane, the rear surface of the lens retains its original curvature.

Figure 8:
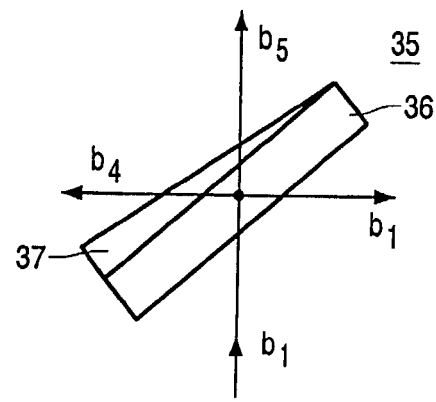
FIG. 8 shows a wedge-shaped element integrated with a beam splitter.

A wedge-shaped element may also be integrated with the beam splitter, as schematically illustrated in FIG. 8. This Figure shows only a wedged beam splitter 35, comprising a conventional beam-splitting portion 36 and a wedge portion 37 at the side of the signal detector 24 (not shown in FIG. 8).

The use of a wedgeshaped element can be combined with tilting of the signal detector and/or positioning the intensity sensor off-axis. The advantage of such a combination is that, as the required false radiation suppressing function is distributed on more than one element, each element has to contribute only part of the total function so that offsets introduced by the elements because of their function can be kept at a minimal and acceptable level.

As shown in FIG. 1, the optical scanning device may comprise a quarter-wavelength ($\lambda/4$) plate 16. This plate is used for preventing reflected radiation returning towards the laser source from influencing radiation emitted by the laser source. This laser emits linearly polarized light in a given direction. When the beam $b_3$ passes through the $\lambda/4$ plate 16, the linear polarization is converted into a circular polarization having a given polarization rotation, i.e. left or right circularly polarized radiation. Upon reflection by the optical disc, the polarization rotation is reversed and on passing through the $\lambda/4$ wavelength plate 16, the polarization of the beam $b_3$ is altered to a linear polarization which is orthogonal to the original linear polarization of the beam. The portion of the reflected beam that is reflected by the beam splitter 8 towards the laser source 2, i.e. beam $b_7$ in FIG. 3, thus has a polarization orthogonal to the polarization of beam $b_1$ generated by the laser and cannot interfere with beam $b_1$ and thus cannot disturb the beam emitted by the laser.

The presence of the $\lambda/4$ plate in an optical scanning device allows the use of another solution according to the present invention for solving the problem of false radiation incident on the monitor diode. This solution is arranging a polarization filter 40 in front of the monitor diode, as illustrated in FIG. 8. This filter transmits the portion of the laser radiation transmitted by the beam splitter 8 towards the intensity sensor and blocks radiation having a polarization direction orthogonal to that of said portion. As beam $b_6$ stems from the orthogonal polarized reflected beam $b_4$, filter 40 blocks beam $b_6$.

The advantage of using such a polarization filter is that it also blocks the portion of the reflected beam that is reflected by the radiation source 2 (beam $b_8$ in FIG. 3) and transmitted towards the monitor detector (beam $b_9$ in FIG. 3) so that this filter is very effective. Also the polarization filter may be combined in a scanning device with one or more of the solutions of the invention described herein before, like tilting the signal detector and arranging a wedge-shaped element in front of this detector, or with an off-axis intensity sensor. Such a combination provides the advantages as mentioned herein before.

In the foregoing it has been assumed that beam splitter 8 is a neutral splitter, i.e. its functioning is independent of the polarization of an incident beam. The radiation-paths of the scanning device, both towards the disc and towards the signal detector can be made much more radiation-efficient by using a polarization-sensitive beam splitter, also called polarizing beam splitter, in combination with a λ/4 plate 16. This beam splitter may also take the shape of a plate or a cube. A conventional polarizing beam splitter is used. in an optical scanning device without an intensity sensor. This beam splitter passes substantially 100% of the source radiation towards the disc and 100% of the radiation reflected by the disc towards the signal detector, due to the selected polarization property of the beam splitter and the polarization rotation through 90° by the λ/4 plate. As in the scanning device discussed here, a minor portion of the incident radiation should be directed to the intensity sensor, a conventional polarization-sensitive beam splitter cannot be used. It becomes necessary to use a special kind of polarizing beam splitter, which may be called partially polarizing beam splitter.

A scanning device with a partially polarizing beam splitter has the same configuration as that of, for example FIG. 7, only the coating, i.e. a stack of thin layers, at the polarizing face 9 of the beam splitter has a different composition. The terms reflectivity (R) and transmittivity (T) will be used to describe the percentage of radiation intensity, which is reflected and transmitted by a beam splitter, respectively. The term "partially polarizing" means that the reflectivity of the beam splitter for one linear polarization is significantly unequal to, and different for example, by at least 10% from, the reflectivity of the beam splitter for the orthogonal polarization. One polarization is, for example, an "s" polarization, which in this example is the polarization of the incident radiation beam between the source and the quarter-wavelength plate. The orthogonal polarization is then a "p" polarization, which in this example is the polarization of the reflected beam between the quarter-wavelength plate and the detector. The perfectly polarizing case (100%, or practically 100%, reflectivity for one polarization and 100%, or practically 100%, transmittivity for the other) is not achieved.

In an embodiment of the scanning device the reflectivity of the beam splitter for the incident radiation (Rs) is selected between 75% and 100%. By ensuring that the reflectivity is above 75%, the writing power of the incident radiation beam is maintained at a high level. However, for a reflectivity above 97%, a forward-sensing signal becomes so low that including coating manufacturing tolerances, the spread in signal levels becomes too large. More preferably, the range is selected between 85% and 95%, thus allowing a relatively low-cost diode, used as the forward sensing diode, i.e.

intensity sensor, 10, to provide accurate and high bandwidth power correction signals during a write procedure. In contrast, if use were made of beam edge detection, i.e. the intensity sensor were placed off-axis, (allowing higher Rs, say Rs>95%), tolerances on the forward-sensing signal would become very large. On the other hand, in this embodiment, the transmittivity of the beam splitter for the reflected radiation beam (Tp) is selected to be significantly less than the above-mentioned reflectivity, namely between 15% and 75%, more preferably between 25% and 62%. Although this relatively low transmittivity reduces the power at the signal detector, compared to a beam splitter exhibiting a higher Tp, power at the signal detector is not so critical during data read-out, whilst the producability of the beam splitter can thereby be significantly improved. Furthermore, by selecting such values for Tp, the angular tolerance of the beam splitter can more readily be maintained at good levels. Limitation of the power during a writing process, in order to remain within the working range of the signal detector 24 during writing, can also be avoided.

One example of the partially polarizing characteristics of a multiple-layer thin-film coating in accordance with this embodiment of the beam splitter is as follows, with the device operating at the CD wavelength (λ=790 nm).

TABLE 1

| λ | Tp | Rp | Ts | Rs |
|---|---|---|---|---|
| $\lambda_1$ (790 nm) | 50% | 50% | 10% | 90% |

Persons skilled in the art can readily implement a beam splitter reflective interface with characteristics matching or coming close to them, by the selecting an appropriate thin layer scheme. The invention can be used advantageously in an optical scanning device including such a beam splitter, and thus highly efficient radiation paths, to prevent the rather large amount of radiation reflected by the signal detector and the laser source from reaching the monitor diode.

Figure 10:
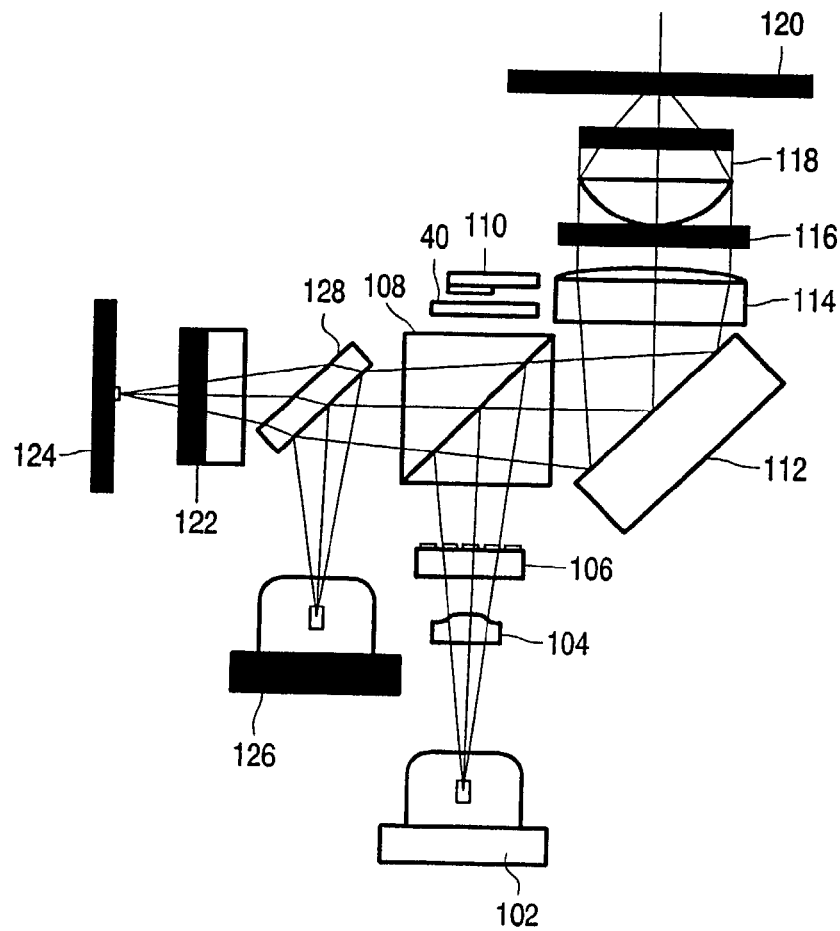
FIG. 10 shows an embodiment of a scanning device which uses two radiation beams having different wavelengths.

FIG. 10 shows a dual-wavelength optical scanning device wherein the invention can be implemented. Such a device is also known as "combi-player" because it is able to scan both CD-type discs and DVD-type discs. To avoid repetition in FIG. 10, elements of the arrangement having the same function as described in relation to elements of the arrangement of FIG. 7, and preceding Figures are denoted by the same reference numerals, incremented by 100. Element 104 is a pre-collimator lens, which makes the divergent beam from the first source 102 less divergent. The scanning device of FIG. 10 further includes a second radiation polarized radiation source 126, for example a semiconductor laser. This source operates at a predetermined wavelength, for example a DVD wavelength ($\lambda_2$=655 nm), and with a linear polarization which is orthogonal relative to that of the first radiation source 102 (for this example we assume a "p" polarization). A second beam splitter 128, in the form of a plate, is used to couple the incident radiation from the second radiation source 126 into the main optical path between the location of the optical disc 120 and the signal detector 124. In this case, formats of optical discs operating at different wavelengths may be selectively scanned, for example the optical disc may be any of the CD (including CR-R and CD-RW) and the DVD formats. Due to the differing characteristics of CD and DVD read-out, the optical components in the main optical path are corrected for DVD read-out.

In this embodiment, a relatively high power write performance is achieved with the beam produced by the first radiation source 102, for writing CD-R and CD-RW discs. On the other hand, radiation source 126 is used for data read-out only.

In this embodiment, quarter-wave plate 116 operates at the first wavelength ($\lambda_1$), that of radiation source 102, only. The effect of the quarter-wave plate at the second wavelength is not critical when, as preferred, the scanning device is arranged such that for this wavelength Ts and Tp are approximately equal in the path between the disc and the signal detector. For ease of manufacture, the quarter-wave plate may not have a quarter-wave functionality at the second wavelength. Since furthermore the first radiation beam only passes through the second beam splitter in its reflected state, there is no need for the second beam splitter 128 to be polarizing, and, for ease of manufacture, is therefore preferably non-polarizing.

For the second radiation beam, the second beam splitter is optimized, on the one hand, to reflect as much of the incident beam as possible, to couple the beam into the main optical path. On the other hand, the second beam splitter should transmit as much as possible of the reflected beam. Since Tp+Rp=100% (assuming no absorbency), an optimized power at the signal detector will be achieved if Tp and Rp are selected, for the second wavelength, to be in the region of 50%. Furthermore, since the reflectivity characteristics of the beam splitter can be varied in dependence on the wavelength, an ideal setting for the transmittivity of the first beam splitter 108 for the first wavelength is 100%. Therefore, a practical value close to 100% (say 90% or more) is arranged for the first beam splitter when operating at the second wavelength.

For the first radiation beam, the characteristics described above for the embodiment of FIG. 7 in relation to the first beam splitter also apply here, along with the ensuing advantages described. These include ease of manufacture, which is otherwise decreased because the beam splitter must operate with selected characteristics at two different wavelengths. For the first radiation beam, an ideal setting for the transmittivity of the second beam splitter 128 is 100%; therefore a practical value close to 100% (say 90% or more) is arranged for the second beam splitter when operating at the first wavelength.

In the present embodiment, both reflected radiation beams are detected by the same signal detector 124 along the same radiation path, which reduces complexity, both in the optical detection arrangement and in the electronic signal processing circuitry in the optical scanning device. Furthermore, the reflection characteristics of the two beam splitters may be selected such that the optical power at the signal detector in the case of scanning with either of the two beams with different wavelengths fall within a similar range, at least within the dynamic range of the detector. This generally spans a range from its lowest value to a highest value three times that, or higher in the case of particular detector types. Preferably, the reflection characteristics are chosen to be such that the transmittivity of the optical system between the disc and the detector is substantially equal in both cases.

One example of the (ideal) partially polarizing characteristics of a multiple layer thin-film coating for each of the first and second beam splitters, 108 and 128 respectively, in this second embodiment of the scanning device is given in tables 2a and 2b below.

TABLE 2a

| | Beam splitter 108 | | | |
|---|---|---|---|---|
| $\lambda$ | Tp | Rp | Ts | Rs |
| $\lambda_1$ (790 nm) | 50% | 50% | 10% | 90% |
| $\lambda_2$ (655 nm) | 100% | 0% | 100% | 0% |

TABLE 2b

| | Beam splitter 128 | | | |
|---|---|---|---|---|
| $\lambda$ | Tp | Rp | Ts | Rs |
| $\lambda_1$ (790 nm) | 100% | 0% | 100% | 0% |
| $\lambda_2$ (655 nm) | 50% | 50% | 50% | 50% |

In this embodiment, Rs=90% for beam splitter 108 at the first wavelength, to allow the use of a forward-sense diode sensor 110

Figure 11:
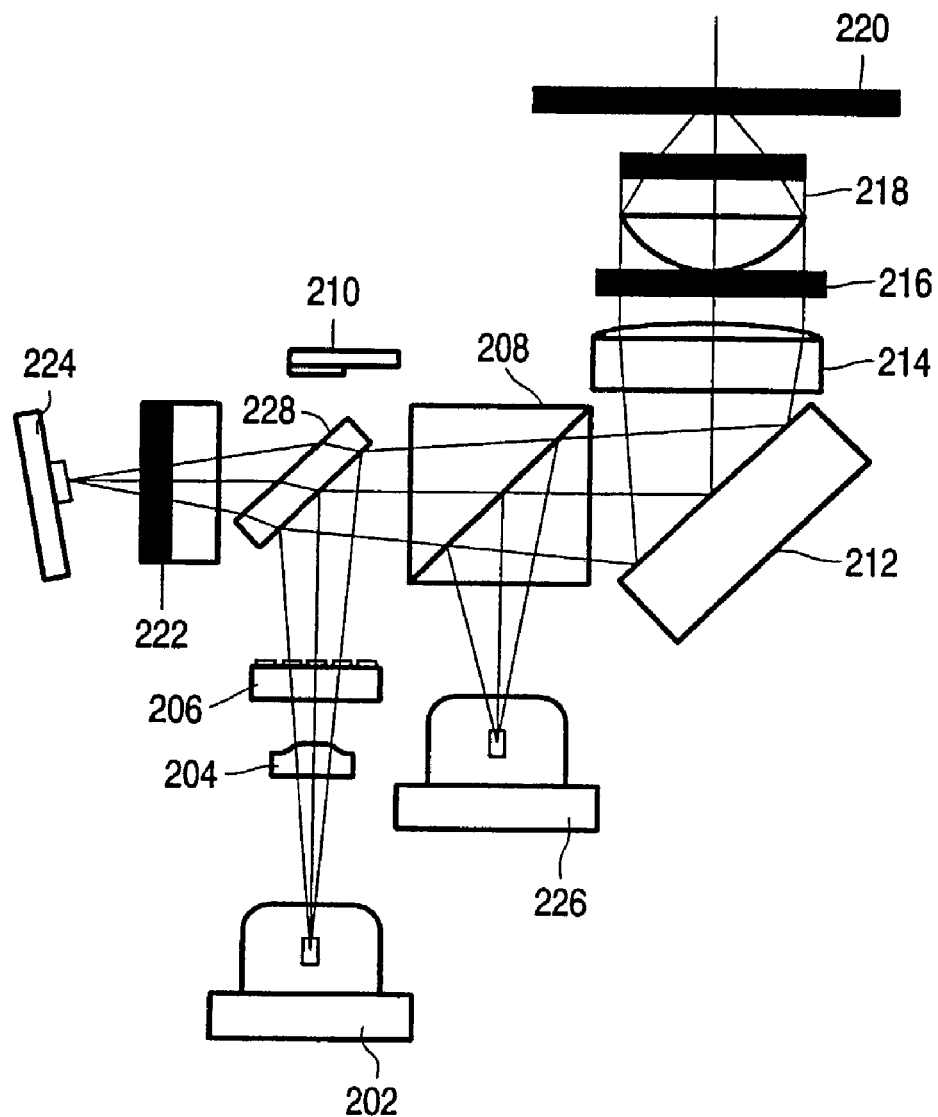
FIG. 11 shows an alternative to this embodiment.

FIG. 11 illustrates another embodiment of the scanning device wherein the invention can be implemented. Again, to avoid unnecessary repetition, the components in this embodiment which correspond to those described in relation to the embodiment of FIG. 10 are denoted by the same reference numerals incremented by 100. In this alternative embodiment, the beam splitter 228, used to couple radiation from the first wavelength radiation source 202 into the main radiation path, is placed further from the optical record carrier than the beam splitter 208, used to couple radiation from the second wavelength radiation source 226 into the main radiation path. The combi-player of FIG. 11 is alternative to that of FIG. 10 in that the CD radiation path and the DVD radiation path have been interchanged.

In the embodiments of FIGS. 10 and 11, a plate-type beam splitter may replace the cubic beam splitter. In this alternative, the beam of the second wavelength is made parallel before entering the beam splitter by means of a further collimator lens placed in front of the beam splitter. The collimator lens for the first wavelength radiation is then placed in front of its respective beam splitter.

Although in the above embodiments the incident beam is passed by reflection at the first beam splitter and the reflected beam is passed by transmission through the first beam splitter, the beams in alternative embodiments are passed by transmission through the first beam splitter towards the disc and in reflection towards the signal detector. In the case of the embodiments of FIGS. 10 and 11, using two wavelengths, the second wavelength incident beam is also passed in reflection by the first beam splitter.

In further alternative embodiments, similar to those of FIGS. 10 and 11, the arrangement is used in a dual writer-scanning device. That is to say, radiation of the first wavelength is used for writing certain optical discs (e.g. CD-R or CD-RW), whilst radiation of the second wavelength is used for writing other optical discs (e.g. DVD+R or DVD+RW) and other recordable disc formats such as DVD-R or DVD-RW or DVD-RAM. In a dual writer-scanning device, a second intensity sensor, i.e. forward-sensing diode may be arranged opposite the radiation source emitting the second wavelength radiation. Furthermore, the quarter-wavelength plate in this embodiment is preferably designed to provide quarter-wavelength functionality at both the first and second wavelengths.

The different embodiments of the combi-player device and the dual-writer scanning device with two radiation sources (source 1 and source 2) wherein the invention can be implemented, can be summarized and characterized as follows.

Source 1 supplies a high power beam with DVD wavelength whilst source 2 supplies a beam with CD wavelength of either high power or low power, or Source 1 supplies a high power beam with CD wavelength whilst source 2 supplies a beam with DVD wavelength of either high power or low power.

High power stands for writing power and low power for reading power, while it should be noted that a writing power source can be switched to a reading power source so that such a source can also be used for reading.

In all of the embodiments shown in FIGS. 10 and 11 and mentioned in relation to these Figures, which show a high radiation efficiency in the path towards the disc and the path towards the signal detector, the invention can be used with great advantage to avoid that radiation portions of the reflected beam, which are reflected by the signal detector and the radiation source are incident on the intensity sensor, or forward-sensing, diode. By way of example, this use is indicated by the polarization filter 40 in FIG. 10 and by the tilted signal detector 224 in FIG. 11.

The above embodiments are to be understood as illustrative examples of the invention. Further embodiments of the invention are envisaged. It is to be understood that any feature described in relation to one embodiment may also be used in the other embodiments. Furthermore, equivalents and modifications not described above may also be employed without departing from the scope of the invention, which is defined in the appendent claims.

The invention claimed is:

1. An optical scanning device for scanning an optical record carrier, said device including a radiation source for emitting an incident radiation beam, a beam splitter located in the path of the incident radiation beam from the radiation source to the location of said optical record carrier and arranged to pass a first portion of the incident beam intensity, which is incident upon the beam splitter, towards the optical record carrier and to pass a second portion of said incident beam intensity towards an intensity sensor for sensing radiation of the incident beam, and a radiation-sensitive signal detector for converting a radiation beam reflected from said optical record carrier and passing along a path including the beam splitter into electric detector signals, characterized by means for redirecting reflected radiation reflected from the radiation-sensitive signal detector and/or the radiation source from reaching the intensity sensor, said means for redirecting including a wedge-shaped element arranged in the path through the beam splitter up to the signal detector.

2. An optical scanning device as claimed in claim 1, characterized in that said means for redirecting are provided for tilting the radiation-sensitive signal detector with respect to an optical axis local to the radiation-sensitive signal detector.

3. An optical scanning device as claimed in claim 1, comprising a focus servolens arranged between the beam splitter and the signal detector, characterized in that the wedge-shaped element and the focus servolens are integrated to one element.

4. An optical scanning device as claimed in claim 1, characterized in that the wedge-shaped element is integrated with the beam splitter.

5. An optical scanning device as claimed in claim 1, characterized in that said means for redirecting comprises a polarization filter arranged between the beam splitter and the intensity sensor, and in that a quarter-wavelength plate is arranged between the beam splitter and the location of the optical record carrier.

6. An optical scanning device as claimed in claim 1, characterized by the additional measure of arranging the intensity sensor off-axis with respect to the local optical axis.

7. An optical scanning device as claimed in claim 1, characterized in that the beam splitter is a polarizing beam splitter.

8. An optical scanning device for scanning an optical record carrier, said device including a first radiation source for emitting a first radiation beam, a beam splitter located in the path of the first radiation beam from the first radiation source to the location of said optical record carrier and arranged to pass a first portion of the first radiation beam incident upon the beam splitter towards the optical record carrier and to pass a second portion of said incident beam intensity towards an intensity sensor for sensing radiation of the first radiation beam, and a radiation-sensitive signal detector for converting a radiation beam reflected from said optical record carrier and passing along a path including the beam splitter into electric detector signals, characterized by means for redirecting reflected radiation reflected from the radiation-sensitive signal detector and/or the radiation source from reaching the intensity sensor, characterized in that the beam splitter is a partially polarizing beam splitter arranged to pass a first proportion of the incident beam intensity incident upon the beam splitter and having a first polarization towards the optical record carrier and to pass a second proportion of the reflected beam intensity incident upon the beam splitter and having a second polarization orthogonal to the first polarization towards the signal detector, said first proportion of intensity being greater, as a proportion, than said second proportion of intensity, and further characterized in that scanning device comprises a second radiation source for emitting a second radiation beam having a different predetermined wavelength, and a second beam splitter for reflecting or transmitting said second radiation beam towards the optical record carrier, wherein the first and second radiation beam both have writing power and in that the intensity of both beams is measured by an intensity sensor.

9. An optical scanning device as claimed in claim 8, characterized in that said beam splitter is arranged to reflect the incident beam and to transmit the reflected beam, the reflectivity of the beam splitter for the polarization of the incident beam being greater than the transmittivity of the beam splitter for the polarization of the reflected beam.

10. An optical scanning device as claimed in claim 8, characterized in that said beam splitter is arranged to transmit the incident beam and to reflect the reflected beam, the transmittivity of the beam splitter for the polarization of the incident beam being greater than the reflectivity of the beam splitter for the polarization of the reflected beam.

11. An optical scanning device as claimed in claim 8, characterized in that said first proportion is greater than 75%.

12. An optical scanning device as claimed in claim 11, characterized in that said first proportion is between 85% and 95%.

13. An optical scanning device as claimed in claim 8, characterized in that said first proportion is less than 97%.

14. An optical scanning device as claimed in claim 8, characterized in that said second proportion is within the range of 15% to 75%.

15. An optical scanning device as claimed in claim 8,l characterized in that said second proportion is within the range of 25% to 62%.

16. An optical scanning device as claimed in claim 8, characterized in that the first beam splitter is arranged to have a substantially non-polarizing effect on radiation of said second wavelength.

17. An optical scanning device as claimed in claim 8, characterized in that said second beam splitter is arranged to have a substantially non-polarizing effect on radiation of said first and/or said second wavelength.

18. An optical scanning device as claimed in claim 8, characterized in that said second beam splitter is arranged to show approximately 50% transmission for radiation of said second wavelength.

19. An optical scanning device as claimed in claim 8, characterized in that said second beam splitter is arranged to show substantially 100% transmission or reflection if or radiation of said first wavelength.

* * * * *